Dec. 13, 1966 J. H. EAGLE 3,291,019
EXPOSURE CONTROL OVERRIDE FOR SUNLIGHT EXPOSURE
Filed Aug. 17, 1964

JOHN H. EAGLE
INVENTOR.

BY R. Frank Smith
Robert W. Hampton

ATTORNEYS

3,291,019
EXPOSURE CONTROL OVERRIDE FOR SUNLIGHT EXPOSURE

John H. Eagle, Rochester, N.Y., assignor to Eastman Kodak Company, Rochester, N.Y., a corporation of New Jersey
Filed Aug. 17, 1964, Ser. No. 390,065
4 Claims. (Cl. 95—10)

The present invention relates to a camera in which an exposure regulating device such as a diaphragm or shutter is normally controlled by a relay in a photoelectric circuit. More particularly the invention concerns means for automatically adjusting such regulating device to an intermediate setting, corresponding to average scene brightness, in the event the photoelectric circuit fails.

In a typical camera of this type, failure of the photoelectric circuit, for example because of low battery output, permits the exposure regulating device to be set by a spring to one of its extreme positions. Such electrical failure thus causes an average scene to be seriously overexposed or underexposed. Often there is no means provided in the camera to apprise the camera operator of such failure and much film can be wasted before he becomes aware of it.

It is therefore an important object of the invention to adjust an exposure regulating member of a camera to an intermediate setting upon failure of a photoelectric system that normally adjusts that member automatically in accordance with scene brightness.

Figure 1:
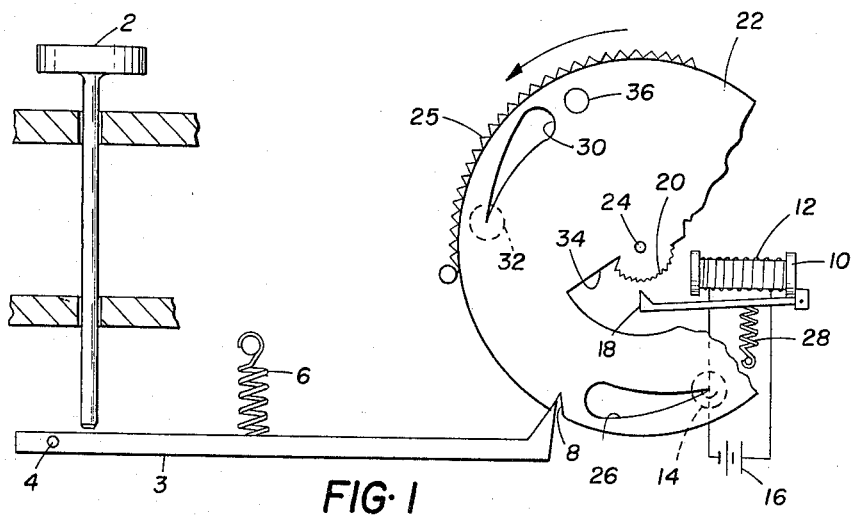
Figure 2:
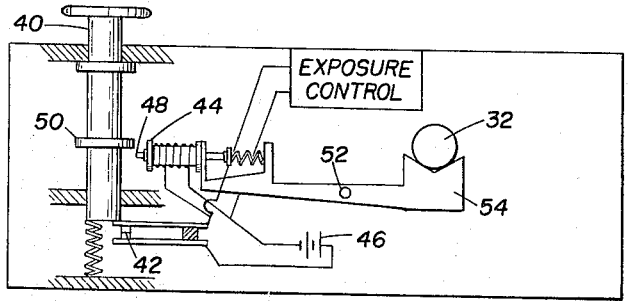
Figure 3:
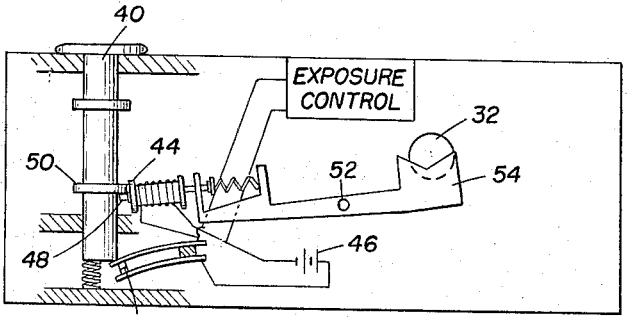

Other objects of the invention will appear from the following description, reference being made to the accompanying drawing, wherein:

FIG. 1 illustrates one form of exposure control system incorporating the invention; and FIGS. 2 and 3 illustrate a second form of exposure control incorporating the invention, FIG. 2 showing the mechanism during an early phase of camera actuation and FIG. 3 showing the mechanism during a later phase of such actuation.

In each of the exposure control systems illustrated in the accompanying drawings, a relay or solenoid comprising an electromagnet is energized under control of a photoresponsive device that is illuminatable by scene light. The relay in turn controls an exposure regulating device, such as a diaphragm vane or a shutter timing member, thereby regulating the exposure of photosensitive film in the camera. Several embodiments of exposure control systems that are operated by relays or solenoids are disclosed in copending U.S. application Serial No. 191,977, filed May 2, 1962, now abandoned.

Referring to FIG. 1, a camera actuating member 2 cooperates with a pawl 3, pivoted at 4 and urged by a spring 6 into engagement with a notch 8 of a diaphragm vane or disk 22. Upon depression of actuating member 2 against the tension of spring 6, pawl 3 is moved out of notch 8, permitting disk 22 to be moved counterclockwise about its axis 24 by a spring 25, for initiating operation of the exposure control system described below.

A relay 10 has a coil 12 energized under control of a photoresponsive device 14, illustrated as a photoresistor in series with a battery 16. In a manner now well known in the art an armature 18 on the relay cooperates with a toothed segment 20 on diaphragm disk 22. Upon camera actuation, during which disk 22 moves counterclockwise about pivot 24 as described above, a tapered aperture 26 in disk 22 progressively exposes photoresistor 14 to more scene light, thereby increasing the energization of relay 10. Disk 22 is stopped when the relay is energized sufficiently to move armature 18 into engagement with segment 20, against the tension of a spring 28. The disk is stopped at a position aligning a portion of a second tapered aperture 30 with the taking lens 32 of the camera, thereby forming an exposure aperture of a size corresponding to scene brightness.

In the event that armature 18 is not moved by the relay in response to camera actuation, for example because of battery failure, a stop surface 34 on disk 22 engages the armature after the normal full travel of disk 22. This stops the diaphragm disk at a position aligning an aperture 36 with lens 32. The size of aperture 36 is determined statistically to produce a normal exposure for average scene brightness.

Referring to FIG. 2, a camera actuating member 40 is depressed to close a pair of contacts 42 for energizing an exposure control circuit including a solenoid 44 and a battery 46. In FIG. 2 the actuating member is shown partially depressed with contacts 42 closed. If the voltage output of battery 46 is adequate to energize solenoid 44, this occurs during the early movement of actuator 40, whereupon a plunger or armature 48 of the solenoid is moved to the right out of the descending path of a collar 50 on the actuator.

On the other hand, if the voltage output of the battery is inadequate to energize the solenoid, collar 50 engages armature 48 (FIG. 3) and pivots the entire solenoid about an axis 52.

A diaphragm vane 54 is rigidly attached to the solenoid and pivots with the solenoid to a position partially covering the taking lens 32, thereby establishing an exposure aperture that is appropriate for average scenes.

The invention has been described in detail with particular reference to preferred embodiments thereof, but it will be understood that variations and modifications can be effected within the spirit and scope of the invention as described hereinabove and as defined in the appended claims.

I claim:
1. An exposure control system for use in a camera and comprising:
    (a) a circuit including a photoresponsive device and an electromagnet energizable under control of said device as a function of scene brightness,
    (b) an armature normally maintained in a first position and movable to a second position in response to a predetermined level of energization of said electromagnet,
    (c) an exposure regulating member movable through a range of positions in which it conditions said camera for correct exposure at a corresponding range of values of scene brightness during normal operation,
    (d) means for moving said regulating member, and
    (e) means controlled by said armature and effective, upon failure of said circuit, for stopping said regulating member at a position corresponding to a predetermined intermediate value of scene brightness, said position being outside said range of positions.

2. The exposure control system defined in claim 1, with a taking lens, said regulating member comprising a diaphragm vane defining an aperture aligned with said lens when said vane is at its last-named position.

3. An exposure control system for use in a camera and comprising:
    (a) a circuit including a photoresponsive device and an electromagnet energizable under control of said device as a function of scene brightness,
    (b) an armature normally maintained in a first position and movable to a second position in response to a predetermined level of energization of said electromagnet,
    (c) manually operable camera actuating means, (d) a movable exposure regulating member having at least first and second positions and being movable to its second position only when said armature is moved to its second position, in the latter of which it conditions said camera for proper exposure at a predetermined intermediate value of scene brightness, and (e) means controlled by said armature, in response to operation of said actuating means, for moving said regulating member from its first position to its second position in the event that said electromagnet is not energized at least at said predetermined level.

4. The exposure control system defined in claim 3, with a taking lens, said regulating member comprising a diaphragm vane defining an aperture limiting member aligned with said lens when said vane is at its second position.

No references cited.

NORTON ANSHER, *Primary Examiner.*